United States Patent
Hegner et al.

(10) Patent No.: US 6,941,814 B2
(45) Date of Patent: Sep. 13, 2005

(54) HYDROPHOBICALLY COATED PRESSURE SENSOR

(75) Inventors: Frank Hegner, Lörrach (DE); Ulfert Drewes, Müllheim (DE); Andreas Rossberg, Bad Säckingen (DE); Elke Schmidt, Schopfheim (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/498,515

(22) PCT Filed: Dec. 18, 2002

(86) PCT No.: PCT/EP02/14443
§ 371 (c)(1),
(2), (4) Date: Jan. 5, 2005

(87) PCT Pub. No.: WO03/054499
PCT Pub. Date: Jul. 3, 2003

(65) Prior Publication Data
US 2005/0103109 A1  May 19, 2005

(30) Foreign Application Priority Data
Dec. 21, 2001 (DE) .......................... 101 63 567

(51) Int. Cl.$^7$ ............................................... G01L 7/00
(52) U.S. Cl. ................................................... 73/706
(58) Field of Search .................. 73/706, 708, 715–728, 73/756

(56) References Cited
U.S. PATENT DOCUMENTS 5,019,140 A * 5/1991 Bowser et al. .................... 96/6

6,675,654 B2 * 1/2004 Hegner et al. ................ 73/715

FOREIGN PATENT DOCUMENTS

| DE | 3918472 A1 | 12/1990 |
| DE | 19621996 C2 | 12/1997 |
| DE | 19825100 A1 | 12/1999 |
| EP | 1061351 A1 | 12/2000 |

* cited by examiner

Primary Examiner—William Oen
(74) Attorney, Agent, or Firm—Bacon & Thomas

(57) ABSTRACT

A pressure sensor for measuring a pressure includes a pressure chamber; and a deformation body, which can be exposed to a medium under pressure, and which, additionally, at least partially bounds the pressure chamber and seals such pressure-tightly from the medium; wherein the walls of the sensor chamber have a hydrophobic coating, which was applied by gas and/or vapor phase deposition. The hydrophobic coating preferably includes a silane. Especially suited are silanes having one or more hydrophobic groups R and one or more anchoring groups X. Especially preferred are: R—Si—$X_3$, $R_1R_2$—Si—$X_2$, $R_1R_2R_3$—Si—X. The hydrophobic group R is preferably an alkyl, perfluoroalkyl, phenyl or perflurorophenyl group. The anchoring group X is preferably an —OH (silanol), —X (halide, e.g. —Cl), —OR (ester, e.g. —OCH3), —NH2 (amine), or —SH (Mercaptosilane). Additionally, aliphatic or cyclic silazanes —Si—NH—Si—, e.g. hexamethyldisilazane, can be used. Likewise suitable are compounds of the type $R_y$—Me—$X_z$, with Me=e.g. Zr, Ti.

17 Claims, 1 Drawing Sheet

HYDROPHOBICALLY COATED PRESSURE SENSOR

This application claims priority to German Patent Application No. PCT/EP02/14443, filed Dec. 18, 2002.

FIELD OF THE INVENTION

The present invention relates to a pressure sensor, especially a relative pressure sensor having a hydrophobic coating. Relative pressure sensors usually measure the difference between the pressure in a medium being measured and the current ambient atmospheric pressure. A relative pressure sensor includes, in general, a platform on which a measuring membrane, or diaphragm, is attached pressure-tightly at its edge, with a pressure chamber being formed between the measuring membrane and the platform. For relative pressure measurement, reference air is introduced into the pressure chamber through an opening in the platform, and the measuring membrane surface facing away from the measuring chamber is exposed to the pressure being measured. The resulting deformation of the measuring membrane is a measure of the relative pressure, and this is transduced in suitable manner into a measurement signal.

BACKGROUND OF THE INVENTION

The mentioned introduction of the reference air brings moisture into the pressure chamber, which condenses in the interior of the sensor when the temperature falls below the dew point. This can degrade the functioning of the sensor. Such is especially the case, when the air surrounding the sensor has a higher temperature than the medium whose pressure is to be measured.

Even when macroscopic condensation with its undesired side-effects has not yet appeared, still a fraction of the water molecules has already been adsorbed from the gas phase onto the surfaces inside the sensor, with this fraction being a function of the temperature of the relevant surfaces and the adsorption energy between the surface and a water molecule. The greater the adsorption energy, the more water molecules will accumulate on the surfaces inside the sensor.

In the case of ceramic pressure sensors, the described problems are aggravated by manufacturing-related material properties, explained below as follows. Starting point for measuring membrane and platform are so-called green bodies, which are formed from a powdered starting material and a binder, and subsequently sintered, so that sintered bodies are obtained from the green bodies. The sintered bodies must, as a rule, be ground or lapped, and this leads not only to rough surfaces, but also to possible fine hair cracks.

In order to manufacture a pressure sensor from a membrane sintered-body and a platform sintered-body, platform and membrane are soldered or brazed together at their edges with interposition of a spacer, such that the mentioned chamber is formed. The solder or active braze material can itself serve as the spacer. An example of solder is a glass frit, while the active braze material can be e.g. a NiTiZr-alloy, in which the NiZr-fraction is about equal to the NiZr-eutectic; compare U.S. Pat. No. 5,334,344. The soldering or brazing is also referred to as joining.

Before the joining of membrane and platform, electrodes are applied to the surfaces which will be facing one another in the chamber following the joining. These electrodes are composed e.g. of tantalum, compare U.S. Pat. No. 5,050,034, and are usually applied by sputtering. But, with sputtering, it cannot be prevented that, due to so-called under-sputtering, small, mutually electrically separated islands of electrode material occur on the surfaces which are supposed to be kept free of electrode material.

SUMMARY OF THE INVENTION

Since water molecules of the reference air can both deposit on the rough surface and penetrate into the hair cracks, electrical connections arise between the separate islands of electrode material, so that the area of the platform electrode gets larger. The water in the hair cracks, present because of capillary condensation, likewise influences the effective electrode areas on the basis of its dielectric constant. This leads, however, to an offset of the zero-point of the pressure sensor. This effect becomes greater, the higher the relative humidity of the reference air.

These problems are mediated within limits by the application on the finished electrodes of a spin-on-glass-layer of silicon dioxide, which mainly serves for solving another problem; see U.S. Pat. No. 5,400,489. This, however, only manages relative humidities up to about 80%. Thus, such pressure sensors can experience, at a relative humidity of 80% and referenced to 40° C., an offset of the zero-point of up to 1% of range. For highly accurate measurements, this is not acceptable.

For improving the ability to tolerate an increased relative air humidity, European Patent Application EP 1 061 351 proposes coating the internal surfaces of a sensor with a hydrophobic material, with silanes being preferred for such application.

Especially in the case of ceramic relative pressure sensors, there is the additional difficulty in the manufacture of the sensors that the impregnation can only be done after the connecting of the separating membrane with the platform, since the temperatures occurring during the connecting are too high for the organic coating material. The coating material must, consequently, be brought in through the opening in the platform into the pressure chamber.

The assignee manufactures relative pressure sensors, which are impregnated with a silane film, with the silane being introduced into the pressure chamber by means of a solvent with a high vapor pressure. Although these impregnations do represent a significant improvement compared with pressure sensors without impregnations, nevertheless there is still room for improvement with regard to the quality of the hydrophobic coatings.

It is, consequently, an object of the present invention to provide a pressure sensor which has an improved hydrophobic coating, and a method for its manufacture.

The object is achieved, according to the invention, by the pressure sensor as defined in the independent claim 1 and the method as defined in the independent claim 10.

The pressure sensor of the invention for measuring a pressure includes: A pressure chamber; and a deformation body, which can be exposed to a medium under the pressure to be measured, and which additionally at least partially borders the pressure chamber and seals such pressure-tightly from the medium; with the walls of the sensor chamber exhibiting a hydrophobic coating, wherein, additionally, the hydrophobic coating is applied by deposition from the gas and/or vapor phase.

The hydrophobic coating preferably comprises silane. Especially suited are silanes having one or more hydrophobic groups R and one or more anchoring groups X. Especially preferred are: $R-Si-X_3$, $R_1R_2-Si-X_2$, $R_1R_2R_3-Si-X$. The hydrophobic group R is preferably an alkyl-, perfluoroalkyl-, phenyl-, or perfluorophenyl-group. The anchoring group X is preferably an —OH (silanol), —X (halide, e.g. —Cl), —OR (ester, e.g. —OCH3), —NH2 (amine), or —SH (mercaptosilane). Additionally, aliphatic or cyclic silazanes —Si—NH—Si—, e.g. hexamethyldisilazane, can be used. Likewise suitable are compounds of the type $R_y$—Me—$X_z$ with Me=e.g. Zr, Ti.

The pressure sensor of the invention is especially a relative pressure sensor, wherein the gas and/or vapor phase deposition occurs through a pressure chamber opening for reference air supply.

Although the deformation body can basically have any shape, fundamentally preferred are deformation body membranes, which are attached to a platform by their edge, this leading to formation of the pressure chamber.

The present invention is suited generally for any pressure sensors, but, for the above-described reasons, it is of special importance for pressure sensors with a ceramic platform and a ceramic measuring membrane. The invention is especially relevant for pressure sensors of a corundum ceramic.

The method of the invention for the coating of a pressure sensor with a hydrophobic material includes the steps of: Placing the sensor in a chamber; evacuating the chamber; and providing at least one coating gas and/or vapor phase, wherein the temperature $T_S$ of the pressure sensor is set such that molecules can adsorb from the first coating gas and/or vapor phase on surfaces of the pressure sensor.

Preferably, the method includes the coating of the walls of a pressure chamber inside the pressure sensor, with the coating occurring via an opening in the pressure chamber.

In a preferred embodiment of the method of the invention, the chamber is evacuated after the providing of the at least one coating gas and/or vapor phase. This facilitates the outgassing of non-adsorbed molecules from the pressure chamber. This manner of proceeding is not, however, essential for the method of the invention, but, instead, is only an option. The chamber can, following the providing of the at least one coating gas and/or vapor phase, also be flushed with a gas, with the flushing occurring preferably following the evacuating of the chamber. However, this flushing is also not essential for the present invention.

Following adsorption of the hydrophobic material, the temperature $T_S$ of the pressure sensor can be increased, in order to effect a modification of the adsorbed material and bring about its chemical adhesion to the substrate. Additionally, this represents a way to achieve the evaporation of excess material from the pressure chamber.

The walls of the chamber are preferably kept at a temperature $T_K$, which prevents the condensation of the molecules of the at least one coating gas and/or vapor phase and minimizes adsorption.

In one variant of the invention, the pressure sensors are treated in a chamber, in which the gas and/or vapor phase is introduced via suitable canals targeted to the individual pressure chambers of the pressure sensors. In this way, only the interior of the pressure sensors is treated.

In another variant, the pressure sensors are arranged such that not only the insides of the sensors are treated but also the outer surfaces of the sensors. This is especially advantageous when a so-called hybrid-element with a moisture-sensitive electronic component is located on the platform of the sensor.

In a further embodiment of the invention, the hydrophobic coating is formed in a sequence of two or more adsorption steps. To this end, first a first gas and/or vapor phase is provided, which contains an anchoring substance, which is adsorbed on the walls of the pressure chamber and is chemically bonded. Subsequently, a second substance is provided, which reacts with the anchoring substance, so that a two-ply, hydrophobic layer is formed. If desired, additional layers can be added in this way.

The build-up of the hydrophobic layer from a plurality of plies is, it is true, more complicated, but it can in some cases lead to an improved quality of the hydrophobic coating, since two or more short molecules can be bonded together for achieving a desired characteristic. Because of the lower mass of the shorter molecules, these can be evaporated more easily and exhibit a greater mobility than heavier molecules for surface diffusion processes, so that films can be formed with greater uniformity and, in some cases, even more quickly.

BRIEF DESCRIPTION OF THE DRAWINGS

Further advantages and aspects of the invention will become evident from the following description of an example of an embodiment and the accompanying drawings, whose figures show as follows.

DETAILED DESCRIPTION OF THE PREFERRED EMBODIMENTS

Figure 1:
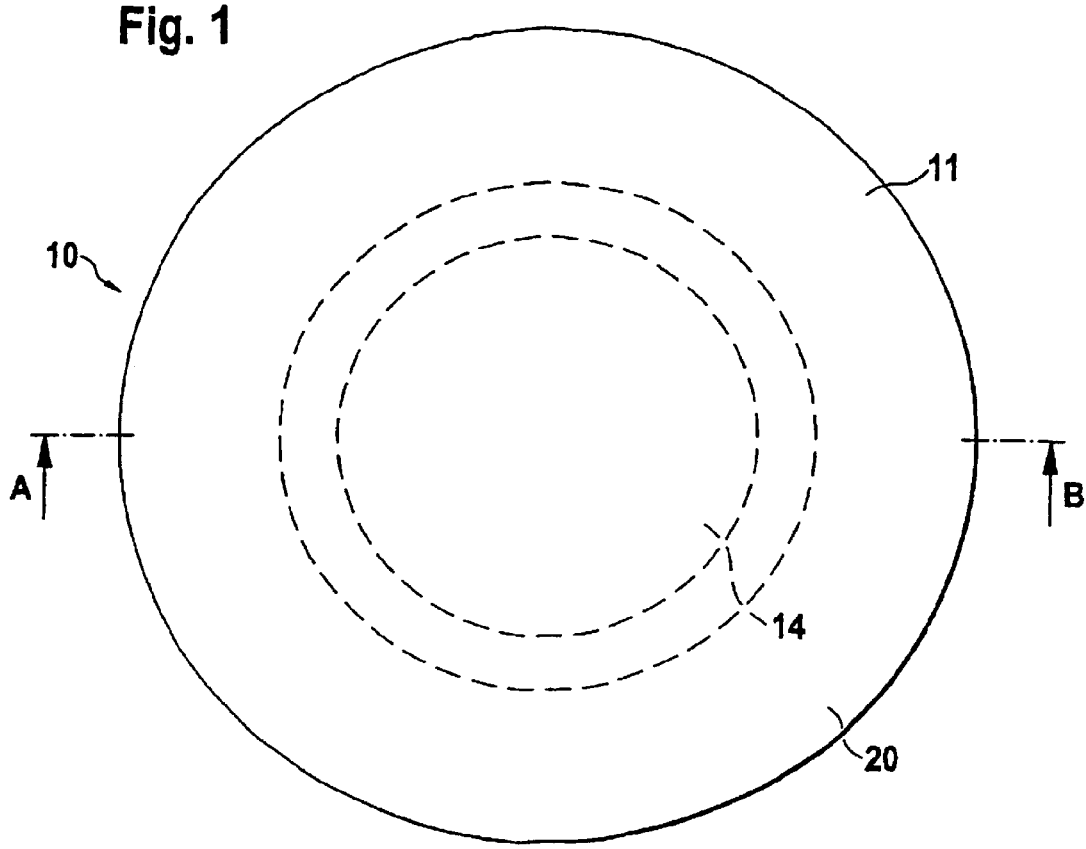
FIG. 1 a plan view of a pressure sensor of the invention.
Figure 2:
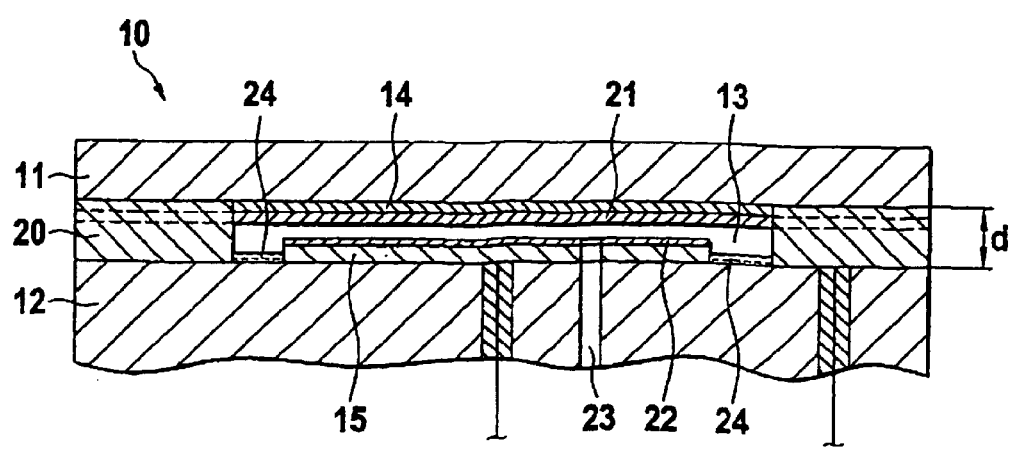
FIG. 2 an elevational view of the pressure sensor of the invention, taken along the cutting plane AB of FIG. 1.

FIGS. 1 and 2 show a capacitive, ceramic pressure sensor 10. The ceramic material is e.g. the aforementioned aluminum oxide of 96 wt.-% to 99 wt.-% purity. Pressure sensor 10 has a membrane 11 in the form of a circularly round disk with plane-parallel surfaces. Additionally, the pressure sensor 10 includes a platform 12, which, except that it is thicker than the membrane 11, has the same shape.

Membrane 11 and platform 12 are, as explained above, brazed together at their respective edges along their entire circumference at a mutual separation d achieved by interposition of a spacer 20. This is done in high vacuum at a temperature of about 900° C. Because of the separation d, membrane 11 and platform 12 form a chamber 13. The membrane 11 is thin and elastic, so that it can flex under a pressure acting on it and thus move back and forth.

Electrodes 14, 15 are placed on the mutually facing surfaces of the membrane 11 and platform 12. The electrodes are preferably of tantalum and are covered on their mutually facing surfaces with a protective layer 21, 22 of tantalum dioxide. Compare the explanation of this in the mentioned U.S. Pat. No. 5,050,034. Instead of a single electrode 15 on the platform 12, a plurality of electrodes can also be provided thereon.

However, the surface of the platform 12 is polished before the electrode 15 is applied, this being in addition to the usual grinding or the optional lapping, in order to reduce remaining roughness further, which is a first step for achieving the object of the invention. Preferably, polishing is to a roughness of less than 0.05 $\mu$m. This polishing significantly reduces the acceptance of the surface for the aforementioned, disadvantageous deposition of water molecules. The polishing is, however, not absolutely required, if a hydrophobic impregnation is going to be used.

The electrode 14 covers the membrane 11 completely and therefore connects itself during joining with the spacer 20 of an active braze material. The electrode 15 of the platform 12 is, in contrast thereto, applied such that it is not electrically connected with the spacer 20. The electrodes 14, 15 are applied by the mentioned sputtering, which, in the case of the electrode 15 of the platform 12, is done through the explained mask.

Finally, located in the platform 12 is a bore 23, which can e.g. already have been created during the green body phase. Bore 23 extends through the electrode 15, since the opening on the chamber end is not sealed by the sputtering of the electrode onto the platform. Consequently, the pressure chamber 13 is not sealed, but, instead, is open to the exterior, this, of course, being a basic necessity of a relative pressure sensor.

Because the mentioned under-sputtering cannot be avoided on the polished surface of the platform 12, the pressure chamber 13 of each already-joined pressure sensor 10 is coated internally with a thin layer 24 of a hydrophobic material. The layer 24 is shown in FIG. 2 for reasons of clarity only on the surface of platform 12 not covered by the electrode 15. The layer 24, however, covers all surfaces bounding the cavity of the pressure chamber 13 completely.

The hydrophobic layer 24 passivates, above all, not only the aforementioned islands of electrode material resulting from the under-sputtering, but also the surface areas of the platform 12 lying between these islands, with the roughness remaining after the hard working (i.e. the grinding and/or the polishing) and with the hair cracks, against all water deposition. In this way, the mentioned enlargement of the electrode surface is practically completely eliminated, as the measured values given above in the discussion of the advantages show.

Application of the hydrophobic coating is accomplished by placing preferably a batch of a number of pressure sensors in a chamber.

A pre-treatment of the cells is not required, since the surfaces of the pressure sensors are extremely clean, due to the mentioned sinter and joining, high-vacuum process. This is an ideal beginning condition for obtaining a good adherence of the hydrophobic layer 24.

The pressure sensors are brought to a temperature $T_S$, which enables, on the one hand, the surface diffusion of the hydrophobic molecules for forming an ordered layer, and, on the other hand, does not lead immediately to a desorption of adsorbed hydrophobic molecules. Equally possible is a temperature $T_S$, which leads to a condensation of the hydrophobic molecules. This effects an increased molecule density (excess material can be desorbed following the treatment by providing a temporary temperature increase.

The chamber is, moreover, evacuated, with a pressure of 1.0 mbar to 0.001 mbar being completely sufficient for the present purposes.

Subsequently, a gas and/or vapor phase containing suitable hydrophobic molecules is provided, for instance by bring a container containing the material to a temperature at which the material exhibits a vapor pressure of from 1 mbar to about 1 bar. The container is either located directly in the chamber or in a side-chamber separated from the chamber by a plate valve.

Optionally, the container is arranged beneath a support plate, which, at the same time, covers the container, and has a plurality of canals, whose diameter preferably corresponds to the diameter of the bore 23. The pressure sensors are in this case arranged on the support plate, with always the bore 23 of a pressure sensor, the bore through which the coating of the pressure chamber occurs, aligned with one of the canals, which extend through the support plate, so that the hydrophobic material is guided preferentially into the pressure chambers. If need be, the canals can be closed by a slide valve, which permits sufficiently accurate control of the treatment time for the pressure sensors.

After the gas and/or vapor treatment has run for a sufficient amount of time, the chamber can then be evacuated anew. This is, however, only one option for the method and in no way absolutely necessary.

At the end of this embodiment of the invention, the temperature $T_S$ of the pressure sensors is increased, in order, on the one hand, to desorb possibly surplus material, and, on the other hand, to effect a chemical bonding of the hydrophobic material on the chamber walls. In this way, the walls of the pressure chamber are impregnated with a stable, hydrophobic film, which effects the desired improvement by decreasing sensitivity to moisture.

What is claimed is:

1. Pressure sensor for measuring the difference between a pressure being measured and an ambient pressure, comprising:
    a sensor chamber; and
    a deformation body, exposed to a medium under the pressure to be measured, and which additionally seals said sensor chamber, at least on part of the cavity thereof, pressure-tightly from the medium, wherein:
    the walls of said sensor chamber have a hydrophobic coating,
    said hydrophobic coating is applied by gas and/or vapor phase deposition, and
    said sensor chamber has a chamber opening, through which it can be exposed to a reference pressure, and the gas and/or vapor phase deposition occurred through the chamber opening.

2. The pressure sensor as claimed in claim 1, further comprising:
    a basebody, wherein:
    said deformation body is in the form of a membrane which is secured with its edge to form said sensor chamber between the basebody and said membrane.

3. The pressure sensor as claimed in claim 2, wherein: said deformation body comprises a ceramic material.

4. The pressure sensor as claimed in claim 3, wherein: said basebody comprises a ceramic material.

5. The pressure sensor as claimed in claim 4, wherein: said ceramic material comprises an aluminum oxide ceramic, especially corundum.

6. The pressure sensor as claimed in claim 1, wherein: said pressure sensor is a capacitive pressure sensor, which has electrodes in the pressure chamber.

7. The pressure sensor as claimed in claim 1, wherein: said hydrophobic coating comprises silane.

8. A method for coating a pressure sensor with a hydrophobic material, comprising the steps of:
    placing the sensor in a chamber;
    evacuating the chamber; and
    providing at least one coating gas and/or vapor phase, wherein:
    the temperature of the pressure sensor $T_s$ is such that molecules can adsorb from the coating gas and/or vapor phase onto the pressure sensor;
    said at least on coating includes coating coating the walls of a pressure chamber inside the pressure sensor, which occurs through an opening in the pressure chamber;
    additionally, the chamber is evacuated following the providing of the at least one coating gas and/or vapor phase, and/or the chamber is flushed with a second gas following said at least one coating gas and/or vapor phase, and the temperature $T_s$ of the pressure sensor is subsequently increased, in order to effect a modification or chemical bonding of the adsorbed material.

9. The method as claimed in claim 8, wherein:

the walls of the chamber are maintained at a temperature $T_k$ during the providing of the coating gas and/or vapor phase, for minimizing an adsorption of the molecules of the at least one coating phase.

10. The method as claimed in claim 8, wherein:

the hydrophobic material comprises silane with one or more hydrophobic groups R and one or more anchoring groups X.

11. The method as claimed in claim 10, wherein:

the silane has the form R—Si—$X_3$, $R_1R_2$—Si—$X_2$, or $R_1R_2R_3$—Si—X.

12. The method as claimed in claim 10, wherein:

the hydrophobic group R is alkyl, perfluoroalkyl, phenyl or perfluorophenyl.

13. The method as claimed in claim 10, wherein:

the anchoring group is a silanol, a halide, an ester or an amine.

14. The method as claimed in claim 8, wherein:

the hydrophobic material comprises aliphatic or cyclic silazane, especially hexamethyldisilazane.

15. The method as claimed in claim 8, wherein:

the hydrophobic material comprises compounds of the type $R_y$—Me—$X_z$; and

Me is a metal, especially Zr or Ti, R a hydrophobic radical, and X an anchoring group.

16. The method as claimed in claim 8, wherein:

the hydrophobic material comprises mercaptosilane.

17. The method as claimed in claim 8, wherein:

the temperature $T_s$ of the pressure sensor is chosen sufficiently low that the hydrophobic material condenses on the surfaces of the sensor.

* * * * *